(12) United States Patent
Uhlenbrock et al.

(10) Patent No.: US 10,909,407 B2
(45) Date of Patent: Feb. 2, 2021

(54) TRANSFER LEARNING OF CONVOLUTIONAL NEURAL NETWORKS FROM VISIBLE COLOR (RBG) TO INFRARED (IR) DOMAIN

(71) Applicant: HRL Laboratories, LLC, Malibu, CA (US)

(72) Inventors: Ryan M. Uhlenbrock, Calabasas, CA (US); Yang Chen, Westlake Village, CA (US); Deepak Khosla, Camarillo, CA (US)

(73) Assignee: HRL Laboratories, LLC, Malibu, CA (US)

(*) Notice: Subject to any disclaimer, the term of this patent is extended or adjusted under 35 U.S.C. 154(b) by 319 days.

(21) Appl. No.: 15/934,767

(22) Filed: Mar. 23, 2018

(65) Prior Publication Data

US 2018/0341832 A1    Nov. 29, 2018

Related U.S. Application Data

(60) Provisional application No. 62/510,741, filed on May 24, 2017.

(51) Int. Cl.
| | |
|---|---|
| G06K 9/46 | (2006.01) |
| H04N 1/40 | (2006.01) |
| G06K 9/62 | (2006.01) |
| G06N 3/04 | (2006.01) |
| G06N 3/08 | (2006.01) |

(52) U.S. Cl.
CPC ......... *G06K 9/4628* (2013.01); *G06K 9/6256* (2013.01); *G06K 9/6267* (2013.01); *G06N 3/0454* (2013.01); *G06N 3/082* (2013.01); *H04N 1/40012* (2013.01)

(58) Field of Classification Search
CPC .. G06K 9/4628; G06K 9/6267; G06K 9/6256; G06N 3/082; G06N 3/0454; H04N 1/40012
See application file for complete search history.

(56) References Cited

U.S. PATENT DOCUMENTS

| | | | |
|---|---|---|---|
| 2006/0074653 A1 | 4/2006 | Mitari et al. | |
| 2016/0180195 A1* | 6/2016 | Martinson | G06N 3/0472 382/103 |
| 2017/0032222 A1* | 2/2017 | Sharma | G06K 9/6256 |

(Continued)

OTHER PUBLICATIONS

Notification of the International Preliminary Report on Patentability Chapter I for PCT/US2018/024168; dated Dec. 5, 2019.

(Continued)

*Primary Examiner* — Phuoc Tran
(74) *Attorney, Agent, or Firm* — Tope-McKay & Associates (57) ABSTRACT

Described is a system for converting a convolutional neural network (CNN) designed and trained for color (RGB) images to one that works on infrared (IR) or grayscale images. The converted CNN comprises a series of convolution layers of neurons arranged in a set kernels having corresponding depth slices. The converted CNN is used for performing object detection. A mechanical component of an autonomous device is controlled based on the object detection.

20 Claims, 7 Drawing Sheets
(2 of 7 Drawing Sheet(s) Filed in Color)

(56) References Cited

U.S. PATENT DOCUMENTS

2017/0076438 A1   3/2017  Kottenstette et al.
2019/0122378 A1*  4/2019  Aswin ..................... G06N 3/08

OTHER PUBLICATIONS

The International Preliminary Report on Patentability Chapter I for PCT/US2018/024168; dated Dec. 5, 2019.
Notification of Transmittal of International Search Report and the Written Opinion of the International Searching Authority for PCT/US2018/024168; dated Apr. 1, 2019.
International Search Report of the International Searching Authority for PCT/US2018/024168; dated Apr. 1, 2019.
Written Opinion of the International Searching Authority for PCT/US2018/024168; dated Apr. 1, 2019.
Naoki Shibuya, 'Pipelines, Mind Maps and Convolutional Neural Networks', Towards Data Science, Feb. 28, 2017.
Yihui Wu et al., 'Traffic Sign Detection based on Convolutional Neural Networks', 2013 International Joint Conference on Neural Networks (IJCNN 2013), Dallas, Texas, USA, Aug. 9, 2013.
Hieu Minh Bui, et al., "Using Grayscale Images for Object Recognition with Convolutional-Recursive Neural Network," 2016 IEEE Sixth International Conference on Communications and Electronics (IEE ICCE 2016), Novotel, Ha Lone, Vietnam, Jul. 29, 2016, pp. 321-325.

* cited by examiner

TRANSFER LEARNING OF CONVOLUTIONAL NEURAL NETWORKS FROM VISIBLE COLOR (RBG) TO INFRARED (IR) DOMAIN

GOVERNMENT LICENSE RIGHTS

This invention was made with government support under U.S. Government Contract Number N00014-15-C-0091. The government may have certain rights in the invention.

CROSS-REFERENCE TO RELATED APPLICATIONS

This is a Non-Provisional patent application of U.S. Provisional Application No. 62/510,741, filed in the United States on May 24, 2017, entitled, "Transfer Learning of Convolutional Neural Networks from Visible Color (RBG) to Infrared (IR) Domain," the entirety of which is hereby incorporated by reference.

BACKGROUND OF INVENTION

(1) Field of Invention

The present invention relates to a system for transfer learning and, more particularly, to a system for transfer learning that converts a convolutional neural network (CNN) designed and trained for color images to one that functions on infrared (IR) or grayscale images.

(2) Description of Related Art

Convolutional neural networks (CNN) (deep) learning are the state-of-the-art in several computer vision tasks, including object detection, object recognition, scene classification, and image captioning. The vast majority of CNN work in the public and academic domains is on color imagery in the visible spectrum. This includes the available large image datasets necessary for CNN training and the resulting weights files of trained networks. Such datasets and trained networks are not nearly as readily available for processing infrared (IR) imagery.

Training IR CNNs from scratch is possible, but is limited by the lack of large IR imagery datasets. Gathering images, labeling classes, and curating a dataset requires significant effort, even more so in IR than RGB (red, green, blue).

Thus, a continuing need exists for a method for direction conversion of a RGB CNN to the IR domain.

SUMMARY OF INVENTION

The present invention relates to a system for transfer learning and, more particularly, to a system for transfer learning that converts a convolutional neural network (CNN) designed and trained for color images to one that functions on infrared (IR) or grayscale images. The system comprises one or more processors and a non-transitory computer-readable medium having executable instructions encoded thereon such that when executed, the one or more processors perform multiple operations. A pre-trained CNN for color RGB input is converted into a CNN that can be applied to infrared (IR) and grayscale input images, resulting in a converted CNN. The converted CNN comprises a series of convolution layers of neurons, wherein the neurons at each convolution layer are arranged in a set kernels having corresponding depth slices. The converted CNN is used for performing object detection. A mechanical component of an autonomous device is controlled based on the object detection.

In another aspect, the system converts a first convolution layer's kernels from RGB to grayscale.

In another aspect, each kernel is treated as a RGB 3-channel image and converted into a single channel grayscale image.

In another aspect, the system identifies and removes first convolution layer kernels having a variance below a predetermined threshold, and removes corresponding depth slices from the identified kernels in a second convolution layer.

In another aspect, the system identifies and merges first convolutional layer kernels having a variance below a predetermined threshold into a single kernel, and merges corresponding depth slices from the identified kernels in a second convolution layer.

In another aspect, the system extracts high-dimensional features from the converted CNN, and trains a classifier using the extracted high-dimensional features.

In another aspect, the autonomous device is an autonomous vehicle.

In another aspect, the autonomous device is a robot.

Finally, the present invention also includes a computer program product and a computer implemented method. The computer program product includes computer-readable instructions stored on a non-transitory computer-readable medium that are executable by a computer having one or more processors, such that upon execution of the instructions, the one or more processors perform the operations listed herein. Alternatively, the computer implemented method includes an act of causing a computer to execute such instructions and perform the resulting operations.

BRIEF DESCRIPTION OF THE DRAWINGS

The file of this patent or patent application publication contains at least one drawing executed in color. Copies of this patent or patent application publication with color drawing(s) will be provided by the Office upon request and payment of the necessary fee.

The objects, features and advantages of the present invention will be apparent from the following detailed descriptions of the various aspects of the invention in conjunction with reference to the following drawings, where.

DETAILED DESCRIPTION

The present invention relates to a system for transfer learning and, more particularly, to a system for transfer learning that converts a convolutional neural network (CNN) designed and trained for color images to one that functions on infrared (IR) or grayscale images. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of aspects. Thus, the present invention is not intended to be limited to the aspects presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

(1) Principal Aspects

Various embodiments of the invention include three "principal" aspects. The first is a system for transfer learning of convolutional neural networks (CNN). The system is typically in the form of a computer system operating software or in the form of a "hard-coded" instruction set. This system may be incorporated into a wide variety of devices that provide different functionalities. The second principal aspect is a method, typically in the form of software, operated using a data processing system (computer). The third principal aspect is a computer program product. The computer program product generally represents computer-readable instructions stored on a non-transitory computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories. These aspects will be described in more detail below.

Figure 1:
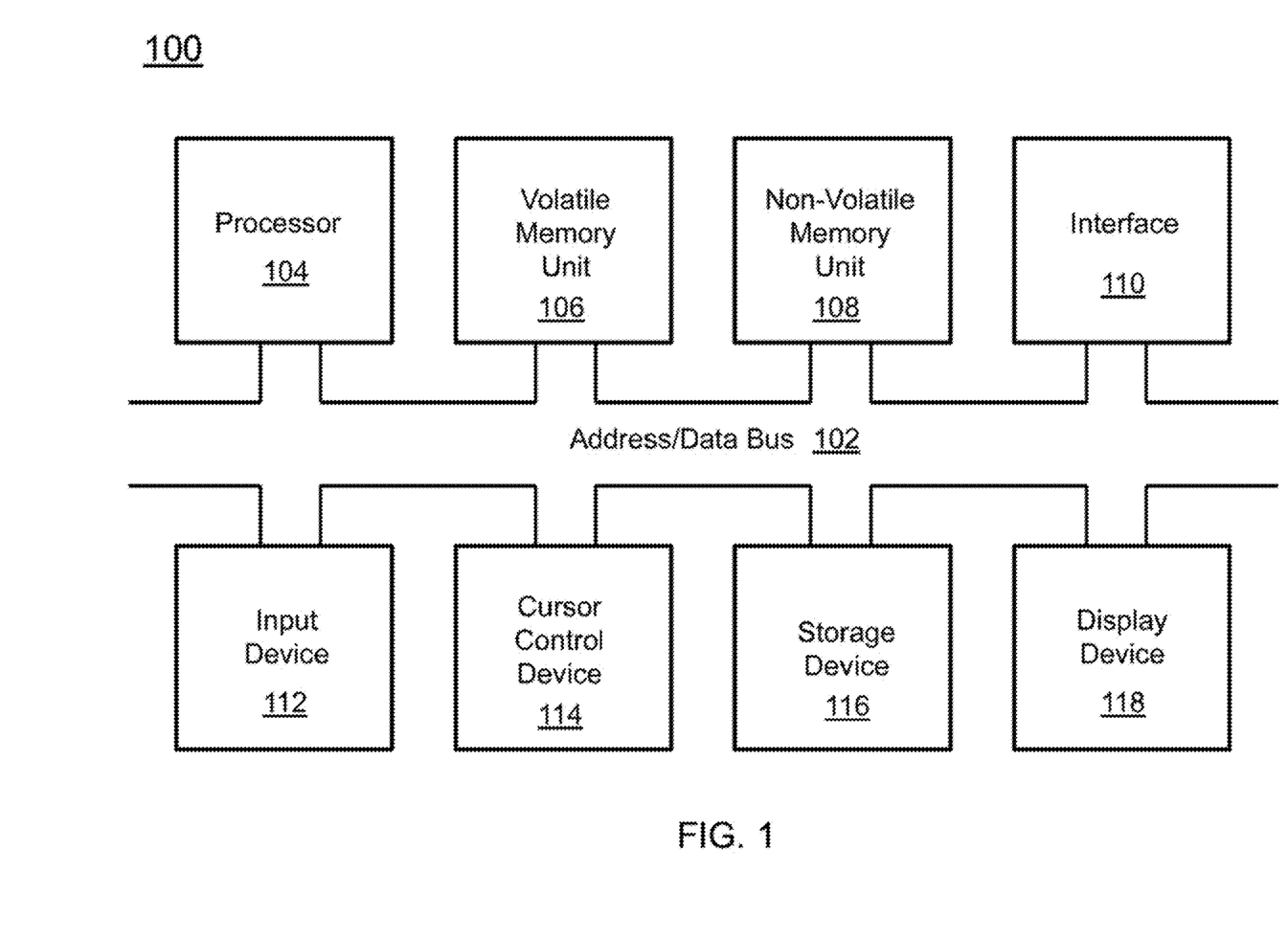
FIG. 1 is a block diagram depicting the components of a system for transfer learning of convolutional neural networks (CNN) according to some embodiments of the present disclosure.

A block diagram depicting an example of a system (i.e., computer system 100) of the present invention is provided in FIG. 1. The computer system 100 is configured to perform calculations, processes, operations, and/or functions associated with a program or algorithm. In one aspect, certain processes and steps discussed herein are realized as a series of instructions (e.g., software program) that reside within computer readable memory units and are executed by one or more processors of the computer system 100. When executed, the instructions cause the computer system 100 to perform specific actions and exhibit specific behavior, such as described herein.

The computer system 100 may include an address/data bus 102 that is configured to communicate information. Additionally, one or more data processing units, such as a processor 104 (or processors), are coupled with the address/data bus 102. The processor 104 is configured to process information and instructions. In an aspect, the processor 104 is a microprocessor. Alternatively, the processor 104 may be a different type of processor such as a parallel processor, application-specific integrated circuit (ASIC), programmable logic array (PLA), complex programmable logic device (CPLD), or a field programmable gate array (FPGA).

The computer system 100 is configured to utilize one or more data storage units. The computer system 100 may include a volatile memory unit 106 (e.g., random access memory ("RAM"), static RAM, dynamic RAM, etc.) coupled with the address/data bus 102, wherein a volatile memory unit 106 is configured to store information and instructions for the processor 104. The computer system 100 further may include a non-volatile memory unit 108 (e.g., read-only memory ("ROM"), programmable ROM ("PROM"), erasable programmable ROM ("EPROM"), electrically erasable programmable ROM "EEPROM"), flash memory, etc.) coupled with the address/data bus 102, wherein the non-volatile memory unit 108 is configured to store static information and instructions for the processor 104. Alternatively, the computer system 100 may execute instructions retrieved from an online data storage unit such as in "Cloud" computing. In an aspect, the computer system 100 also may include one or more interfaces, such as an interface 110, coupled with the address/data bus 102. The one or more interfaces are configured to enable the computer system 100 to interface with other electronic devices and computer systems. The communication interfaces implemented by the one or more interfaces may include wireline (e.g., serial cables, modems, network adaptors, etc.) and/or wireless (e.g., wireless modems, wireless network adaptors, etc.) communication technology.

In one aspect, the computer system 100 may include an input device 112 coupled with the address/data bus 102, wherein the input device 112 is configured to communicate information and command selections to the processor 100. In accordance with one aspect, the input device 112 is an alphanumeric input device, such as a keyboard, that may include alphanumeric and/or function keys. Alternatively, the input device 112 may be an input device other than an alphanumeric input device. In an aspect, the computer system 100 may include a cursor control device 114 coupled with the address/data bus 102, wherein the cursor control device 114 is configured to communicate user input information and/or command selections to the processor 100. In an aspect, the cursor control device 114 is implemented using a device such as a mouse, a track-ball, a track-pad, an optical tracking device, or a touch screen. The foregoing notwithstanding, in an aspect, the cursor control device 114 is directed and/or activated via input from the input device 112, such as in response to the use of special keys and key sequence commands associated with the input device 112. In an alternative aspect, the cursor control device 114 is configured to be directed or guided by voice commands.

In an aspect, the computer system 100 further may include one or more optional computer usable data storage devices, such as a storage device 116, coupled with the address/data bus 102. The storage device 116 is configured to store information and/or computer executable instructions. In one aspect, the storage device 116 is a storage device such as a magnetic or optical disk drive (e.g., hard disk drive ("HDD"), floppy diskette, compact disk read only memory ("CD-ROM"), digital versatile disk ("DVD")). Pursuant to one aspect, a display device 118 is coupled with the address/data bus 102, wherein the display device 118 is configured to display video and/or graphics. In an aspect, the display device 118 may include a cathode ray tube ("CRT"), liquid crystal display ("LCD"), field emission display ("FED"), plasma display, or any other display device suitable for displaying video and/or graphic images and alphanumeric characters recognizable to a user.

The computer system 100 presented herein is an example computing environment in accordance with an aspect. However, the non-limiting example of the computer system 100 is not strictly limited to being a computer system. For example, an aspect provides that the computer system 100 represents a type of data processing analysis that may be used in accordance with various aspects described herein. Moreover, other computing systems may also be implemented. Indeed, the spirit and scope of the present technology is not limited to any single data processing environment. Thus, in an aspect, one or more operations of various aspects of the present technology are controlled or implemented using computer-executable instructions, such as program modules, being executed by a computer. In one implementation, such program modules include routines, programs, objects, components and/or data structures that are configured to perform particular tasks or implement particular abstract data types. In addition, an aspect provides that one or more aspects of the present technology are implemented by utilizing one or more distributed computing environments, such as where tasks are performed by remote processing devices that are linked through a communications network, or such as where various program modules are located in both local and remote computer-storage media including memory-storage devices.

Figure 2:
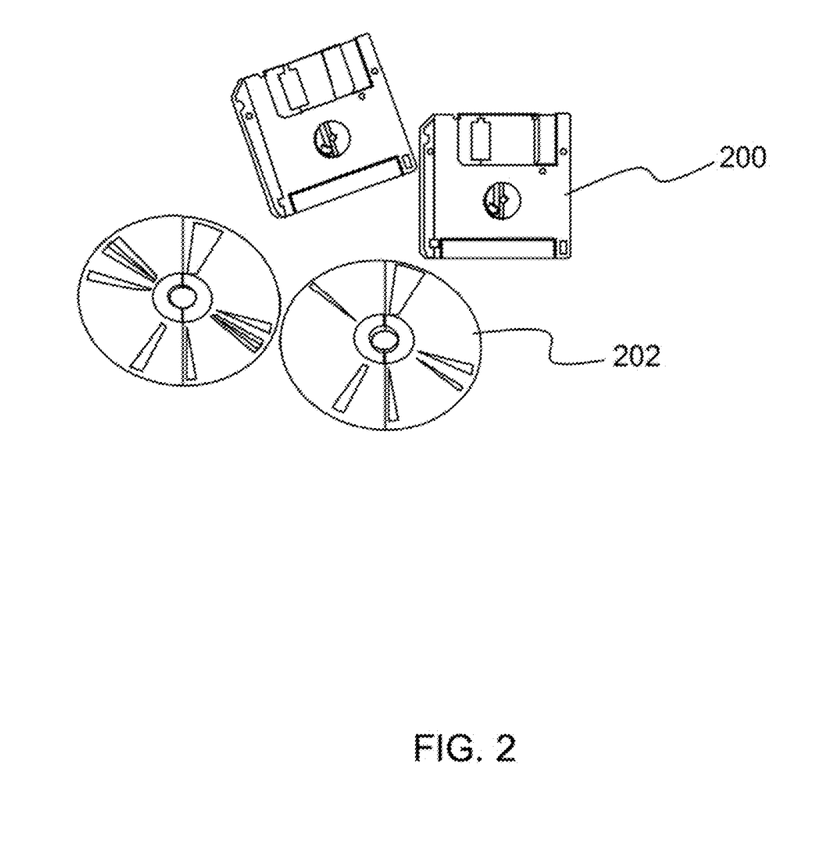
FIG. 2 is an illustration of a computer program product according to some embodiments of the present disclosure.

An illustrative diagram of a computer program product (i.e., storage device) embodying the present invention is depicted in FIG. 2. The computer program product is depicted as floppy disk 200 or an optical disk 202 such as a CD or DVD. However, as mentioned previously, the computer program product generally represents computer-readable instructions stored on any compatible non-transitory computer-readable medium. The term "instructions" as used with respect to this invention generally indicates a set of operations to be performed on a computer, and may represent pieces of a whole program or individual, separable, software modules. Non-limiting examples of "instruction" include computer program code (source or object code) and "hard-coded" electronics (i.e. computer operations coded into a computer chip). The "instruction" is stored on any non-transitory computer-readable medium, such as in the memory of a computer or on a floppy disk, a CD-ROM, and a flash drive. In either event, the instructions are encoded on a non-transitory computer-readable medium.

(2) Introduction

Learning with deep convolutional neural networks is the state-of-the-art in several computer vision tasks, including object detection, object recognition, scene classification, and image captioning. A CNN for image processing consists of a series of layers of neurons that have input from the previous layer and output to the next layer. The first layer contains the input image, and the last layer contains the output which, depending on the application, might be a class probability distribution, set of object bounding boxes, etc. In a "convolutional" neural network specifically, the neurons at each convolution layer are arranged in a set of kernels of weights, each with a width, height, and depth (i.e., three-dimensional (3D) shape). These 3D kernels are convolved over the previous layer's width/height dimensions to produce the output data. The depth of the kernels at layer N has to match the number of channels in layer N−1, and the number of kernels at layer N will be the number of channels in its output, and so on from the input to the output layer.

The vast majority of CNN work in the public and academic domains is on color imagery in the visible spectrum. This includes the available large image datasets necessary for CNN training and the resulting weights files of trained networks. Such datasets and trained networks are not nearly as readily available for processing IR imagery. This invention described herein addresses this problem by taking the results from training in the RGB domain and adapting them such that they can be used or refined in the IR domain. This will enable faster, easier application-specific training of IR CNNs and result in more accurate computer vision on IR imagery for various visual processing applications, non-limiting examples of which include object recognition, scene understanding, behavior recognition, and captioning. Further details are provided below.

(3) Specific Details of Various Embodiments

Described is a system and method for converting a convolutional neural network (CNN) designed and trained for color (RGB) images to one that works on infrared (IR) or grayscale images.

(3.1) Step 1: RGB to IR/Gray Conversion

In a typical RGB CNN network, the input layer accepting color images will have 3 channels (e.g., 227×227×3 for a 227×227 pixel image), and the kernels in the first convolution layer will have a depth of 3 (e.g., 11×11×3×96, where 96 is the number of kernels, which also equals to the number of channels for the second convolution layer). In an IR CNN network, the input layer accepting IR images will have 1 channel (e.g., 227×227×1 for a 227×227 pixel image), and the kernels in the first convolution layer will have a depth of 1 (e.g., 11×11×1×96).

Figure 3:
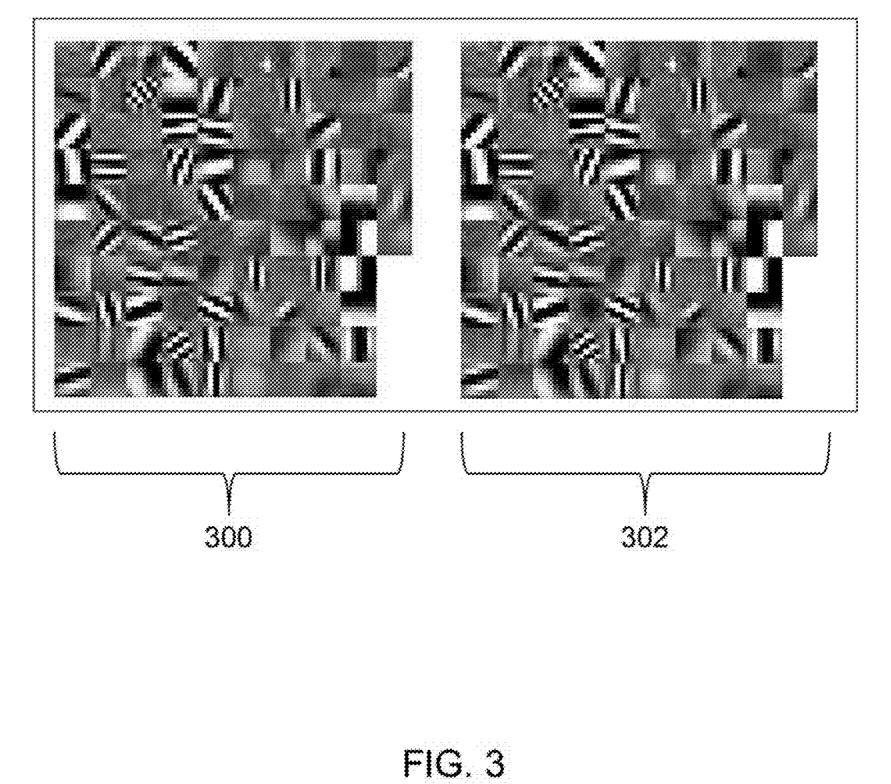
FIG. 3 is an illustration of 7×7 kernels arranged in a mosaic from an RGB (red, green, blue) CNN before and after being converted to single channel kernels for an infrared CNN according to some embodiments of the present disclosure.

First, the first convolution layer's kernels are converted from RGB to grayscale. Each kernel is treated as a small RGB 3-channel image and converted to a single channel grayscale image of the same size by applying the formula at each pixel:

$$\text{gray}(i,j)=0.299r(i,j)+0.587g(i,j)+0.114b(i,j), \forall i,j \text{ over the kernel width and height,}$$

where r, g, b represent the 3 channels of each kernel, and gray(i, j) is the resulting single channel kernel. In the above example, the kernel width and height are both 11. FIG. 3 shows an example of a 96 11×11 kernels arranged in a mosaic from an original first-layer kernels of an RGB CNN (element 300) and the converted single channel kernels for an IR CNN or grayscale input (element 302) using the approach according to embodiments of the present disclosure.

(3.2) Step 2: Remove Non-Informative Kernels

Figure 4:
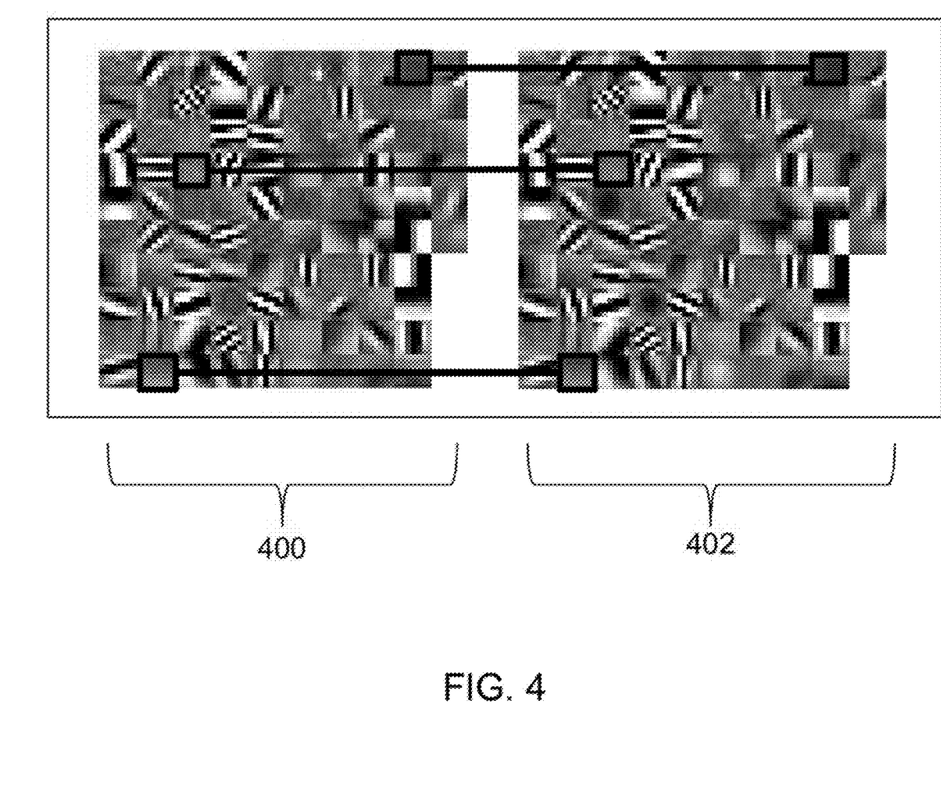
FIG. 4 is an illustration of RGB kernels before and after conversion according to some embodiments of the present disclosure.

As depicted in FIG. 3, many kernels are almost identical before and after conversion (comparing elements 300 and 302, respectively), such as those that detect changes in intensity along object boundaries or edges. However, when converting from 3 channels to 1 channel naturally, some information is lost. As a result, some kernels after conversion no longer represent a useful, discriminating filter. For example, FIG. 4 is an illustration of RGB kernels before (element 400) and after (element 402) conversion according to some embodiments of the present disclosure. Some RGB kernels that respond to particular colors in element 400 become constant gray patches, as indicated by the outlined patches in element 402 of FIG. 4.

The second step of the method according to embodiments of the present disclosure is to identify and remove those first convolution layer kernels from the conversion with variance below a certain threshold. The removal of certain kernels will reduce the number of output feature layers (e.g., from 96 to 96-K where K is the number of such kernels being removed). This necessitates removing the corresponding depth slices from the kernels in the second convolution layer. Thus, each of the second layer convolution kernels will have K fewer slides for a depth of (96-K).

Figure 5:
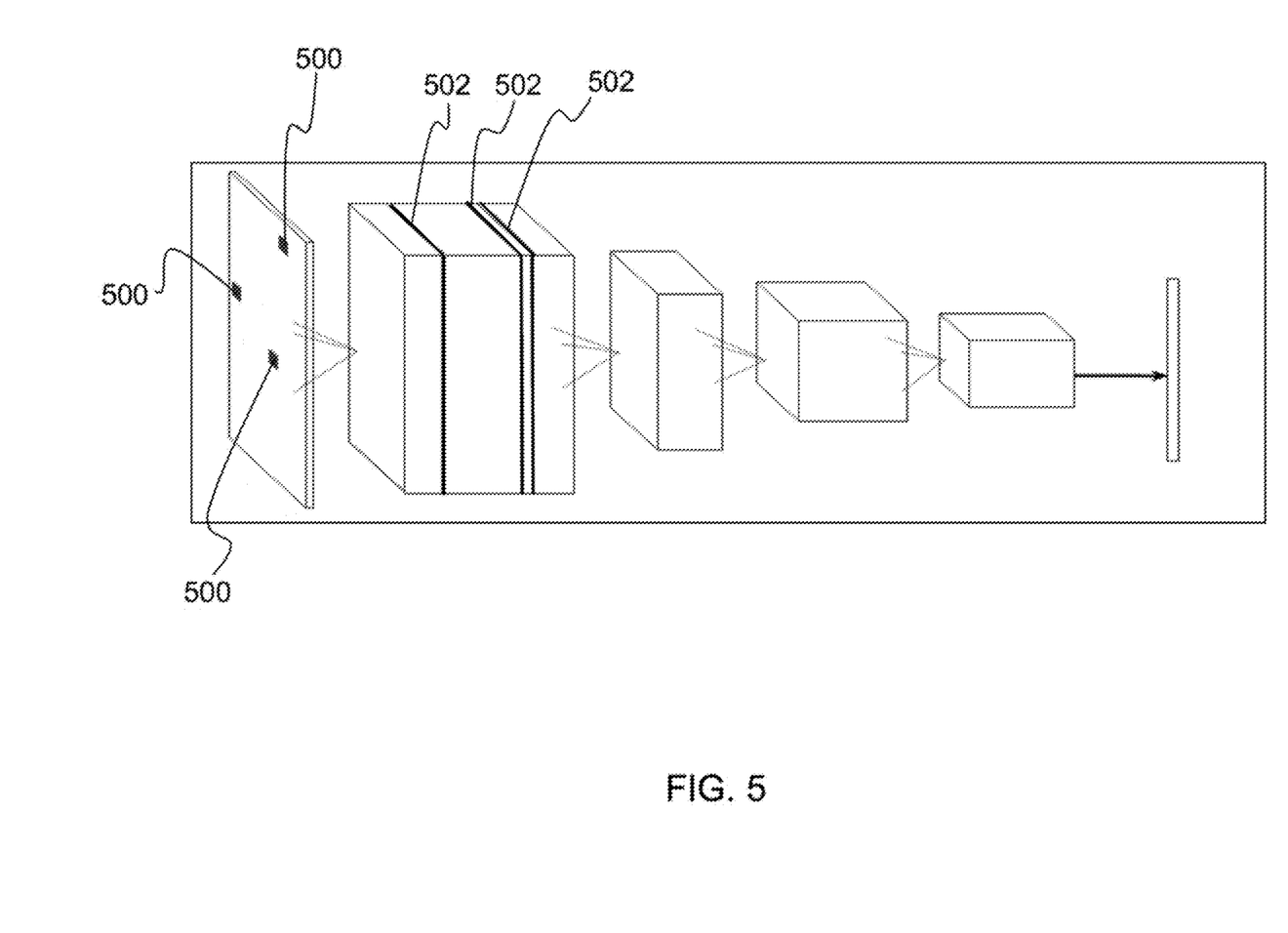
FIG. 5 is an illustration of removal of non-informative "flat" kernels after conversion and the reduction of the corresponding output feature maps according to some embodiments of the present disclosure.

FIG. 5 illustrates removal of non-informative "flat" kernels after conversion (represented by squares 500) and the reduction of the corresponding output feature maps (bold lines 502), which necessitates the kernel depth reduction of the second convolution layer.

(3.3) Step 2: Merge Non-Informative Kernels

In an alternative embodiment, instead of totally eliminating non-informative (flat) kernels after the conversion as outlined above, one can alternatively merge these kernels into a single kernel to minimize the disturbance the conversion may have caused:

$$gray_m(i,j) = \Sigma gray_k(i,j) \forall k=1,2,\ldots K, \forall i,j \text{ over the kernel width and height, and}$$

$$b_m = \Sigma b_k \forall k=1,2,\ldots K,$$

where $gray_k$ are the gray scale kernels identify to be non-information (or "flat") as described above, and $b_k$ are the corresponding biases of those kernels.

After the merging, the non-informative (flat) kernels are replaced with a single merged kernel represented by $gray_m$ and $b_m$, and the output feature maps corresponding to the K kernels being merged will collapse into one channel. This requires us to merge the corresponding slices of the kernels for the second convolution layer in a similar way:

$$kern_m(i,j) = \Sigma kern_k(i,j) \forall k=1,2,\ldots K$$

$\forall i,j$ over the second convolutional kernel width and height, where $kern_k$ is $k^{th}$ slice of a second convolution layer kernel, and $kern_m$ is the merged slice of the kernel.

(3.4) Experimental Studies (3.4.1) First Embodiment: Color CNN as Initialization In the first embodiment, a previously trained CNN was used on color images as initialization and some domain-specific IR training was performed. The approach outlined above was implemented and tested as follows. First, start with a CNN that was pre-trained on image frames from the UCF-101 color activity dataset. Then, the first layer kernel weights from the trained CNN is converted from 7×7×3 dimensionality to 7×7×1. The rationale for this initialization is that many feature detectors learned on RGB data would also be useful in processing IR data (e.g., horizontal edge detectors). Other features looking for color contrasts become flat gray patches that are not as useful in IR. It will be useful to learn how to leverage large existing RGB datasets while also learning features specific to IR.

This refined CNN is now re-trained on Long Wave Infrared (LWIR) data that comprises videos from both static and moving ground vehicles, with scenarios involving human actors performing 13 types of activities involving carrying objects (e.g., carrying mock-RPG, suitcase, shovel). Training and testing data were image chips extracted from the IR videos based on the ground truth bounding boxes. The 16-bit IR chips were converted to 8-bit, rescaling the range on a per-chip basis. Data was partitioned using approximately 80% sequences as training and 20% as testing from both stationary and moving platforms. Chips smaller than 50 pixels in height were not considered in either training or testing.

The 13 activity types were divided into three main classes (SMALL, LARGE, CASE) based on the size of the object being carried. The CASE class is a separate class that includes a person carrying a suitcase (since the number of opportunities for the "case" class is much smaller than for the other two classes). Test classification accuracy is about 65% correct on the 3-class problem. The confusion matrix was:

|  | SMALL | LARGE | CASE |
| --- | --- | --- | --- |
| SMALL | 70.7 | 26.3 | 3.0 |
| LARGE | 54.3 | 44.3 | 1.4 |
| CASE | 22.3 | 7.8 | 69.8 |

Global correct %: 65.314685

(3.4.2) Second Embodiment: Converted Color CNN Feature Extractor

A CNN previously trained on color images was taken as initialization and converted into a CNN that is ready to process IR images. No additional CNN training is needed in this embodiment; only a traditional machine learning classifier training is needed as a last step. An open-source CNN (e.g., OverFeat, AlexNet) was trained on large data set of ImageNet consisting of millions of color images. The first layer color RGB kernels were converted into gray scale as previously outlined above. Additionally, any flat kernels from the conversion and corresponding slices of the second layer convolution kernels were removed as outlined above.

At this point, the original CNN for color RGB input has been converted to one that is fully ready to accept IR or grayscale images. However, instead of using this converted CNN as the starting point to do domain-specific training as done in embodiment 1 (e.g., activity recognition in IR videos), the last layer of the CNN (i.e., the classifier layer) is taken away, and instead the high dimensional feature vector that was input to this layer is used. In the case of AlexNet and OverFeat, this is a 4096-D feature vector. Then, a domain-specific traditional machine learning classifier (e.g., Support Vector Machine) is trained using these features. The advantage of this approach is that one can now have a domain-specific system (pre-trained CNN+SVM classifier) without lots of training data that would have been required if one had started out from scratch, especially in IR domain where training data is scarce. For example, if one wanted to train a classifier to recognize different types of tanks in IR, but had only a small number (e.g., 20-100) of images of each tank type, this would normally not be enough training data to tune the many parameters of a CNN. However, an RGB CNN trained on millions of images of cars could be tuned more easily and would learn features that would also apply to tanks. The system described herein can convert the CNN to IR, use it as a feature extractor, train an SVM last layer on the limited IR data, and then have an effective IR tank classifier.

Figure 6:
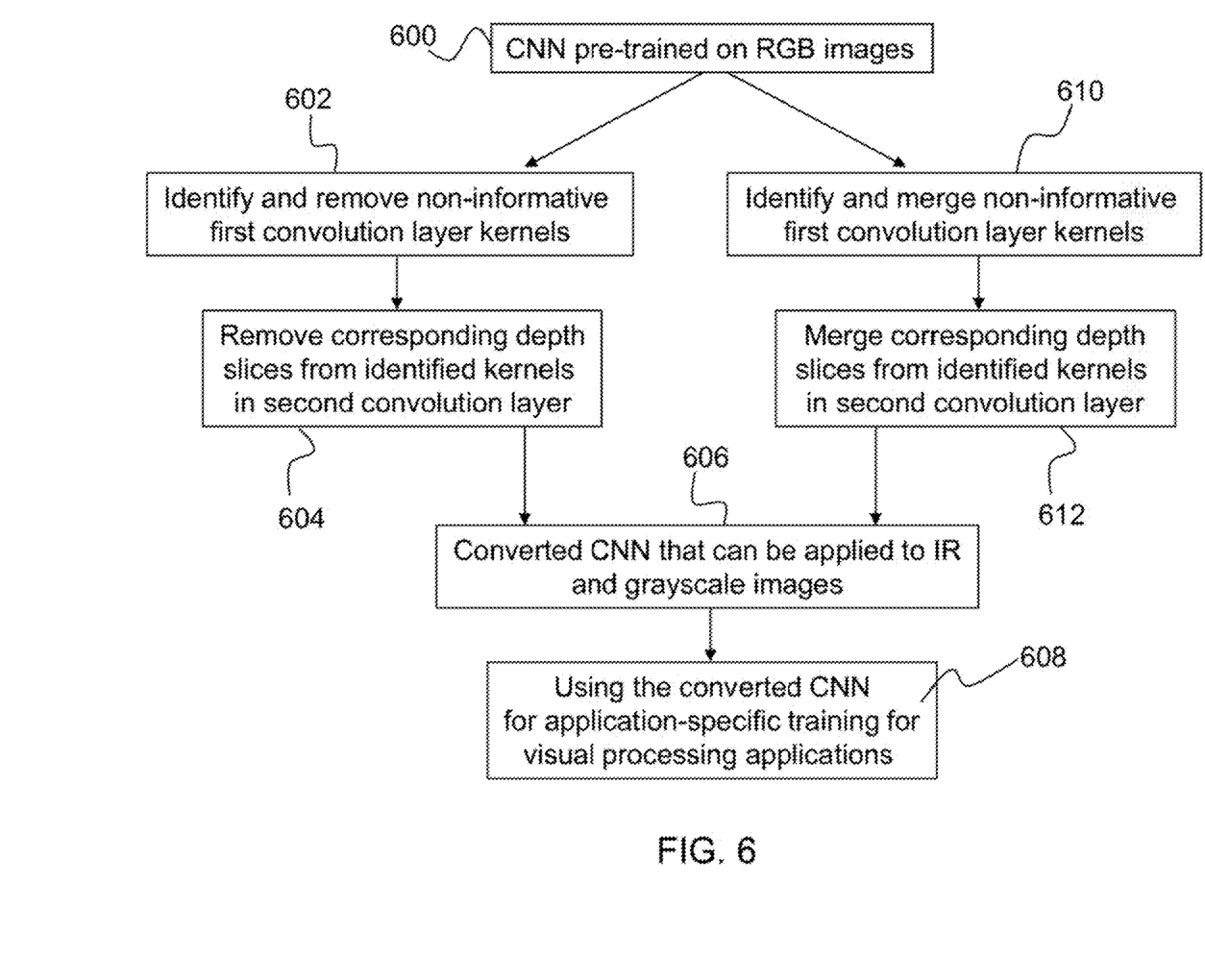
FIG. 6 is a flow diagram illustrating a system for transfer learning that converts a CNN designed and trained for color images to one that functions on infrared (IR) or grayscale images according to some embodiments of the present disclosure.

FIG. 6 is a flow diagram summarizing the system according to embodiments of the present disclosure. In one embodiment, from a CNN pre-trained on RGB images (element 600), non-informative kernels of the first convolution layer are identified and removed (element 602). The corresponding depth slices from the identified kernels are removed in the second convolution layer (element 604). In another embodiment, non-informative kernels of the first convolution layer of a CNN pre-trained on RGB images (element 600) are identified and merged (element 610). The corresponding depth slices from the identified kernels are merged in the second convolution layer (element 612). In both embodiments, the result is a converted CNN that can be applied to IR and grayscale images (element 606). The converted CNN can be used for application-specific training (element 608).

The approach according to embodiments of the present disclosure leverages many open-source CNNs trained (or custom-trained) on large data sets of RGB images that are readily available. The converted CNNs can be used for applications, such as object detection, object recognition, scene classification, and image captioning, with IR or grayscale images, significantly reducing training and development efforts. This invention is relevant to any application that uses or needs IR camera sensors.

Figure 7:
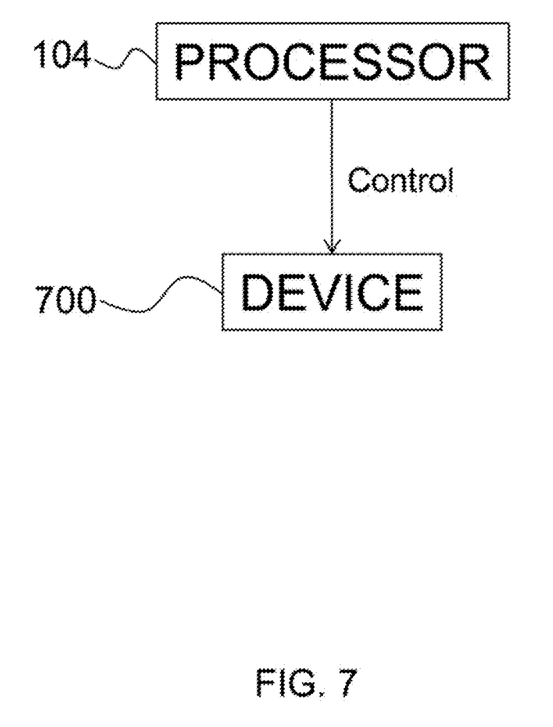
FIG. 7 is a flow diagram illustrating control of devices using the converted CNN according to some embodiments of the present disclosure.

FIG. 7 is a flow diagram illustrating using a processor 104 to control a device 700 using the converted CNN. Non-limiting examples of devices 700 that can be controlled via the processor 104 include a motor vehicle or a motor vehicle component (electrical, non-electrical, mechanical), such as a brake, a steering mechanism, suspension, or safety device (e.g., airbags, seatbelt tensioners, etc.). Further, the vehicle could be an unmanned aerial vehicle (UAV), an autonomous self-driving ground vehicle, or a human operated vehicle controlled either by a driver or by a remote operator. For instance, upon object detection and recognition, the system can cause the autonomous vehicle to perform a driving operation/maneuver (such as steering or another command) in line with driving parameters in accordance with the recognized object. For example, if the system recognizes a bicyclist or another vehicle, the system described herein can cause a vehicle maneuver/operation to be performed to avoid a collision with the bicyclist or vehicle (or any other object that should be avoided while driving). The system can cause the autonomous vehicle to apply a functional movement response, such as a braking operation followed by a steering operation, to redirect vehicle away from the object, thereby avoiding a collision.

Other appropriate responses may include one or more of a steering operation, a throttle operation to increase speed or to decrease speed, or a decision to maintain course and speed without change. The responses may be appropriate for avoiding a collision, improving travel speed, or improving efficiency. As can be appreciated by one skilled in the art, control of other device types is also possible. Thus, there are a number of automated actions that can be initiated by the autonomous vehicle given the particular object detected and the circumstances in which the system is implemented. For instance, the method can be applied to border security (e.g., detecting smugglers at night), intelligence, surveillance, and reconnaissance (ISR), drones, autonomous vehicles, and perception and safety in autonomous systems (e.g., detecting humans interacting with robots in a manufacturing environment).

In a manufacturing environment, for instance, the device 700 can be an autonomous device, such as a robot, needs an IR camera to do its job (e.g., detecting hot vs. cold surfaces in a steel mill) and the robot is working alongside humans, the system can process images from the IR camera to detect where the humans are for safety based on the infrared radiation emitted from the humans. Specifically, the system can cause the robot to avoid coming into physical contact with the humans. In this example, the system would cause an avoidance operation to be performed, which would include an operation/maneuver that controls mechanical components of the robot causing the robot to stop, turn, accelerate, slow down, or make no movement action depending on the situation. The ability to use IR sensors in this situation is an improvement and cost savings over adding an additional RGB sensor to the robot.

Finally, while this invention has been described in terms of several embodiments, one of ordinary skill in the art will readily recognize that the invention may have other applications in other environments. It should be noted that many embodiments and implementations are possible. Further, the following claims are in no way intended to limit the scope of the present invention to the specific embodiments described above. In addition, any recitation of "means for" is intended to evoke a means-plus-function reading of an element and a claim, whereas, any elements that do not specifically use the recitation "means for", are not intended to be read as means-plus-function elements, even if the claim otherwise includes the word "means". Further, while particular method steps have been recited in a particular order, the method steps may occur in any desired order and fall within the scope of the present invention.

What is claimed is:

1. A system for transfer learning of convolutional neural networks (CNNs), the system comprising:
   one or more processors and a non-transitory computer-readable medium having executable instructions encoded thereon such that when executed, the one or more processors perform operations of:
      converting a CNN pre-trained for color RGB input into a CNN that can be applied to infrared (IR) and grayscale input images, resulting in a converted CNN,
      wherein the converted CNN comprises a series of convolution layers of neurons, wherein the neurons at each convolution layer are arranged in a set of kernels having corresponding depth slices;
      applying the converted CNN to at least one IR or grayscale input image;
      detecting an object in the at least one IR or grayscale input image; and
      controlling a mechanical component of an autonomous device based on the object detection.

2. The system as set forth in claim 1, wherein converting the pre-trained CCN further comprises an operation of converting a first convolution layer's kernels from RGB to grayscale.

3. The system as set forth in claim 2, wherein each kernel is treated as a RGB 3-channel image and converted into a single channel grayscale image.

4. The system as set forth in claim 2, wherein converting the pre-trained CNN further comprises operations of:
identifying and removing first convolution layer kernels having a variance below a predetermined threshold; and
removing corresponding depth slices from the identified kernels in a second convolution layer.

5. The system as set forth in claim 2, wherein converting the pre-trained CNN further comprises operations of:
identifying and merging first convolutional layer kernels having a variance below a predetermined threshold into a single kernel; and
merging corresponding depth slices from the identified kernels in a second convolution layer.

6. The system as set forth in claim 1, wherein converting the pre-trained CNN further comprises operations of:
extracting high-dimensional features from the converted CNN; and
training a classifier using the extracted high-dimensional features.

7. The system as set forth in claim 1, wherein the autonomous device is an autonomous vehicle.

8. The system as set forth in claim 1, wherein the autonomous device is a robot.

9. A computer implemented method for transfer learning of convolutional neural networks (CNNs), the method comprising an act of:
causing one or more processers to execute instructions encoded on a non-transitory computer-readable medium, such that upon execution, the one or more processors perform operations of:
converting a CNN pre-trained for color RGB input into a CNN that can be applied to infrared (IR) and grayscale input images, resulting in a converted CNN,
wherein the converted CNN comprises a series of convolution layers of neurons, wherein the neurons at each convolution layer are arranged in a set of kernels having corresponding depth slices;
applying the converted CNN to at least one IR or grayscale input image;
detecting an object in the at least one IR or grayscale input image; and
controlling a mechanical component of an autonomous device based on the object detection.

10. The method as set forth in claim 9, wherein converting the pre-trained CNN further comprises an operation of converting a first convolution layer's kernels from RGB to grayscale.

11. The method as set forth in claim 10, wherein each kernel is treated as a RGB 3-channel image and converted into a single channel grayscale image.

12. The method as set forth in claim 10, wherein converting the pre-trained CNN further comprises operations of:
identifying and removing first convolution layer kernels having a variance below a predetermined threshold; and
removing corresponding depth slices from the identified kernels in a second convolution layer.

13. The method as set forth in claim 10, wherein converting the pre-trained CNN further comprises operations of:
identifying and merging first convolutional layer kernels having a variance below a predetermined threshold into a single kernel; and
merging corresponding depth slices from the identified kernels in a second convolution layer.

14. The method as set forth in claim 9, wherein converting the pre-trained CNN further comprises operations of:
extracting high-dimensional features from the converted CNN; and
training a classifier using the extracted high-dimensional features.

15. A computer program product for transfer learning of convolutional neural networks (CNNs), the computer program product comprising:
computer-readable instructions stored on a non-transitory computer-readable medium that are executable by a computer having one or more processors for causing the processor to perform operations of:
converting a CNN pre-trained for color RGB input into a CNN that can be applied to infrared (IR) and grayscale input images, resulting in a converted CNN,
wherein the converted CNN comprises a series of convolution layers of neurons, wherein the neurons at each convolution layer are arranged in a set of kernels having corresponding depth slices;
applying the converted CNN to at least one IR or grayscale input image;
detecting an object in the at least one IR or grayscale input image; and
controlling a mechanical component of an autonomous device based on the object detection.

16. The computer program product as set forth in claim 15, wherein converting the pre-trained CNN further comprises an operation of converting a first convolution layer's kernels from RGB to grayscale.

17. The computer program product as set forth in claim 16, wherein each kernel is treated as a RGB 3-channel image and converted into a single channel grayscale image.

18. The computer program product as set forth in claim 16, wherein converting the pre-trained CNN further comprises operations of:
identifying and removing first convolution layer kernels having a variance below a predetermined threshold; and
removing corresponding depth slices from the identified kernels in a second convolution layer.

19. The computer program product as set forth in claim 16, wherein converting the pre-trained CNN further comprises operations of:
identifying and merging first convolutional layer kernels having a variance below a predetermined threshold into a single kernel; and
merging corresponding depth slices from the identified kernels in a second convolution layer.

20. The computer program product as set forth in claim 15, wherein converting the pre-trained CNN further comprises operations of:
extracting high-dimensional features from the converted CNN; and
training a classifier using the extracted high-dimensional features.

* * * * *